United States Patent [19]
Underhill

[11] 3,915,323
[45] Oct. 28, 1975

[54] BOAT LOADER APPARATUS

[76] Inventor: Oscar E. Underhill, 1009 Barrow St., Anchorage, Alaska 99501

[22] Filed: Dec. 2, 1974

[21] Appl. No.: 528,604

[52] U.S. Cl. .................................. 214/450; 214/77
[51] Int. Cl.² ......................................... B60R 9/00
[58] Field of Search ......... 224/42.1 H; 214/450, 77, 214/83.24

[56] References Cited
UNITED STATES PATENTS

| | | |
|---|---|---|
| 2,985,327 | 5/1961 | Gilkison .............................. 214/450 |
| 3,109,544 | 11/1963 | Learmont .......................... 214/77 R |
| 3,128,893 | 4/1964 | Jones ................................... 214/450 |
| 3,478,908 | 11/1969 | Clark .................................. 214/450 |
| 3,696,953 | 10/1972 | Kim ..................................... 214/450 |
| 3,762,587 | 10/1973 | Longee, Sr. .......................... 214/450 |

*Primary Examiner*—Robert J. Spar
*Assistant Examiner*—Ross Weaver
*Attorney, Agent, or Firm*—Dowell & Dowell

[57] ABSTRACT

Apparatus for loading a boat to a transport position wherein it is supported inverted on the roof of a vehicle and for unloading the boat into a launched position next to the vehicle, the apparatus including an L-shaped hoist frame hinged at its inner leg to an upright panel of the vehicle and supporting the boat on its outer leg such that when the frame is rotated down to the launched position the boat is upright, and when the frame is rotated up to the transport position the frame lies snugly along the vehicle's upright panel and along its roof with the boat on top of it, the apparatus including cable and winch means operative to raise the frame to place the boat in transport position and a series of spring urged conveyors travelling on a rail extending across the roof, the springs yieldably urging the boat and frame toward the launched position against the opposing action of the cable and winch means, so that a person can easily load or unload the boat singlehanded.

8 Claims, 11 Drawing Figures

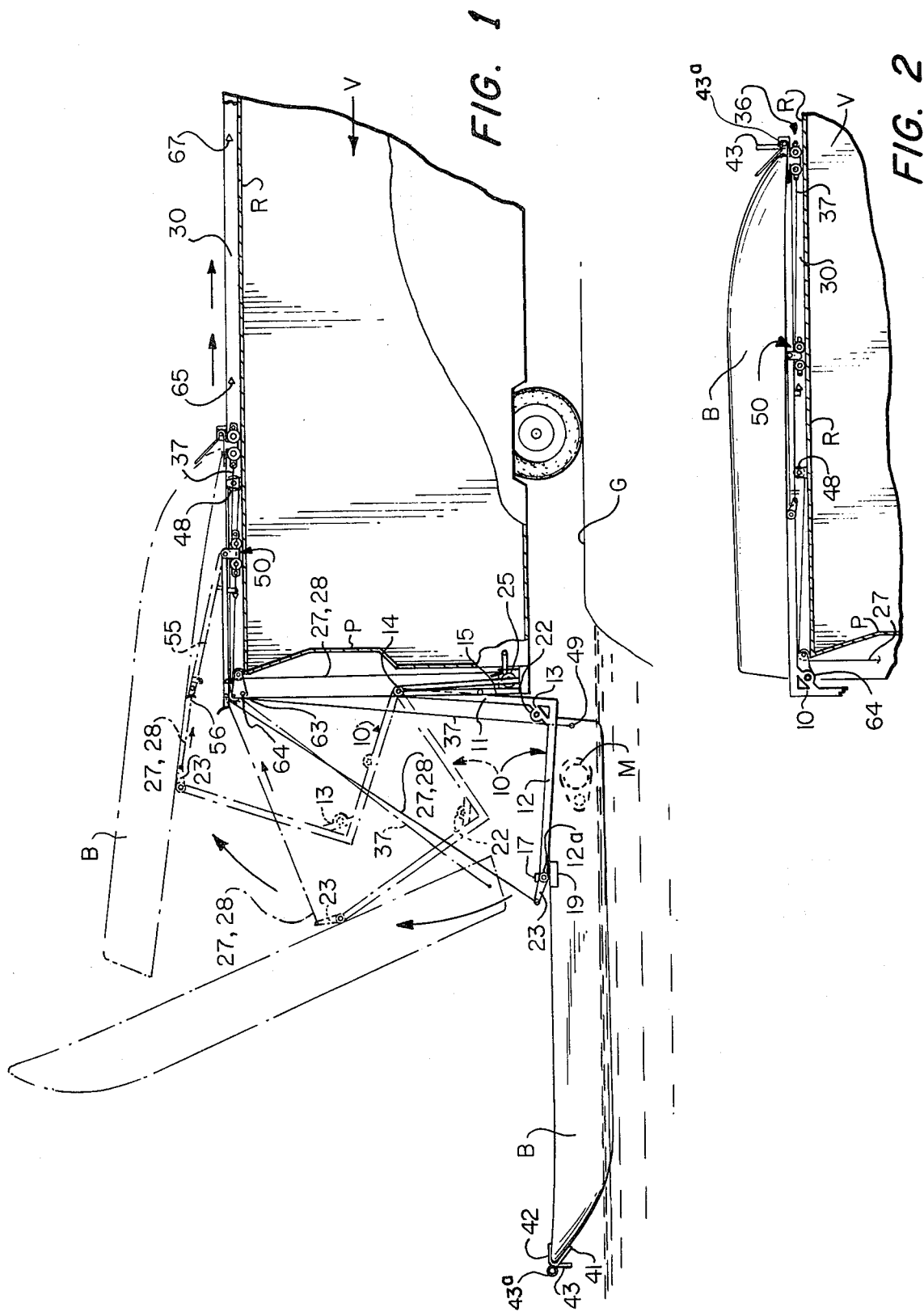

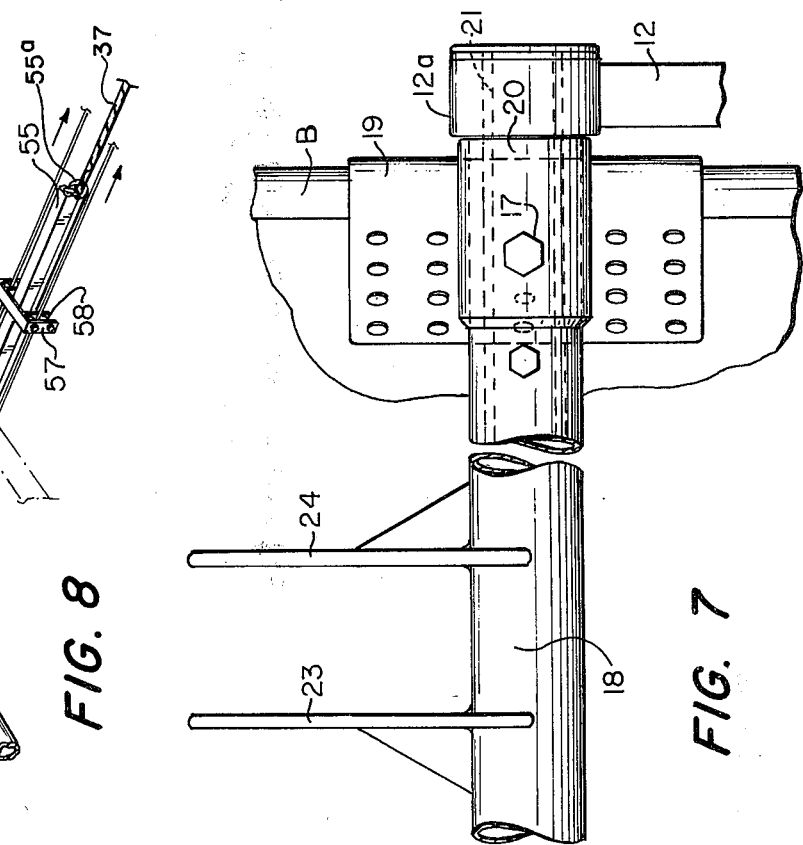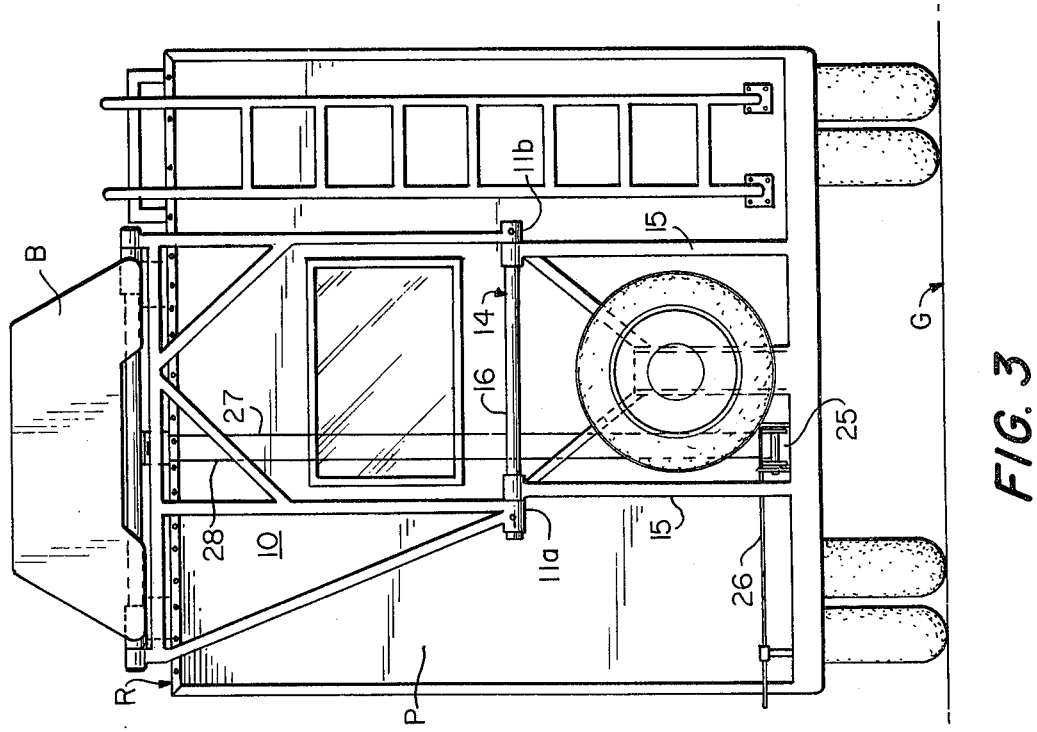

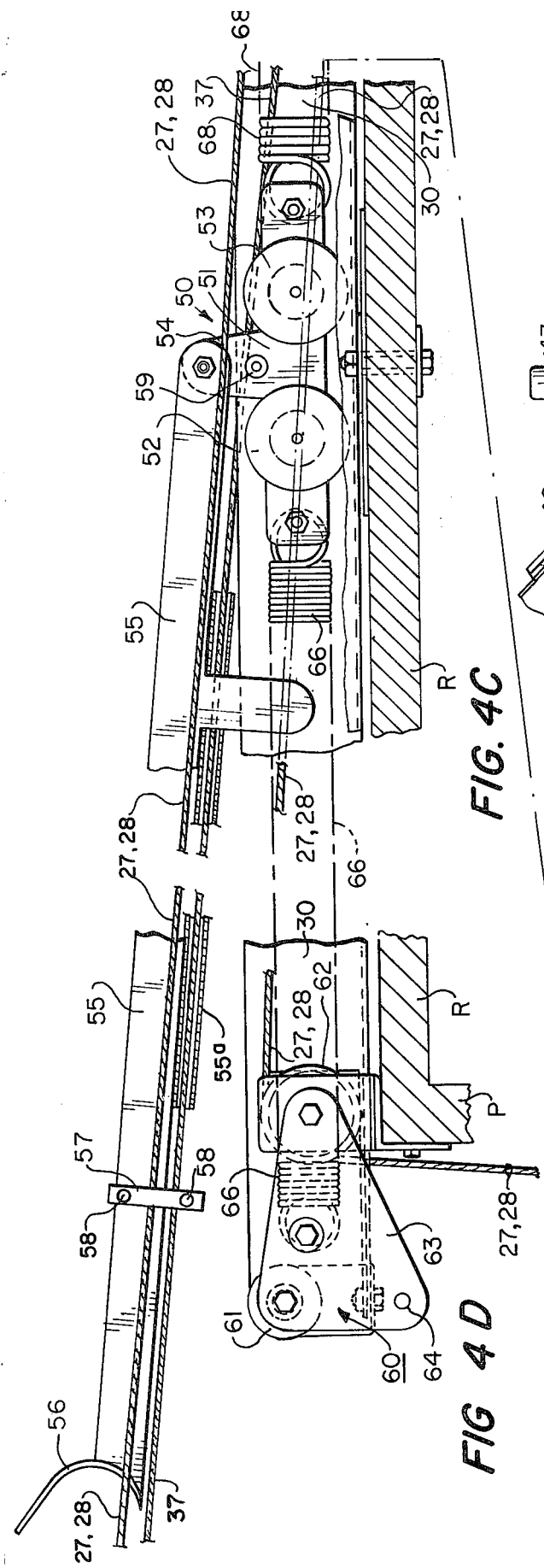
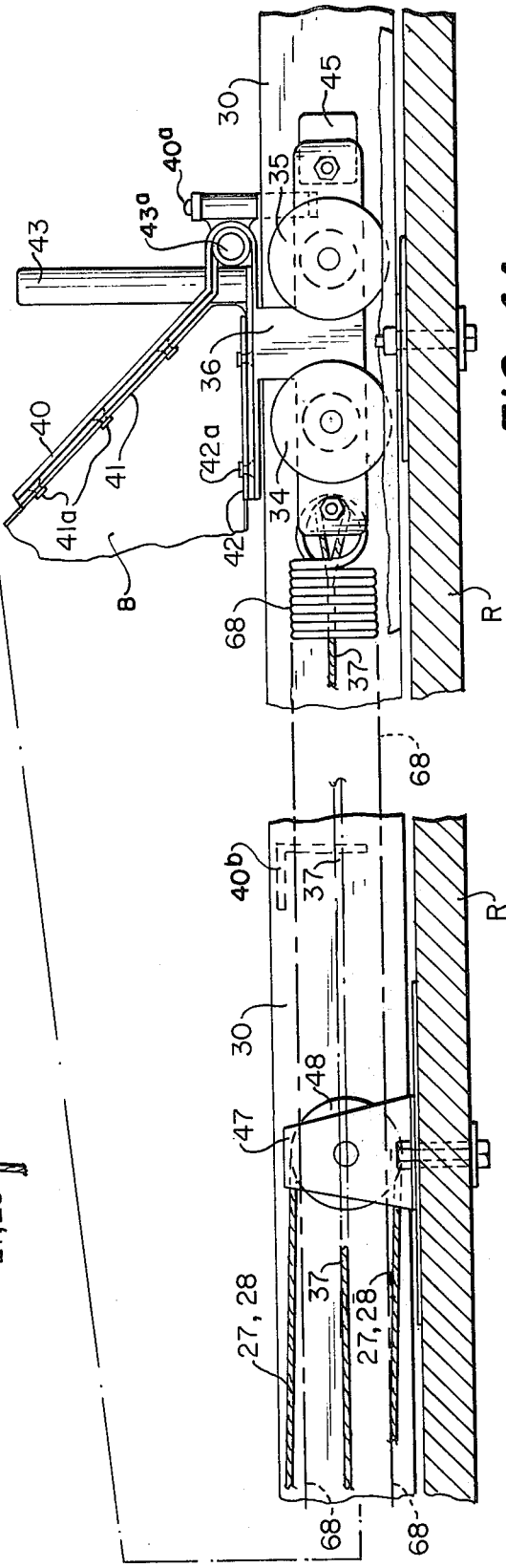

BOAT LOADER APPARATUS

FIELD OF INVENTION

This invention relates to improvements in apparatus for loading and unloading a boat from atop a vehicle, such as a trailer, truck or campmobile, more particularly, using a cable lifted hoist frame and appropriate winch and spring urged guiding means.

BACKGROUND AND PRIOR ART

There are many boat loading means shown in the prior art, such as the one shown in Kirchmeyer U.S. Pat. No. 3,777,922 which moves the boat from a launched position to a stored position using a winch, and then returns it partway toward launched position by spring means, and such as Abel U.S. Pat. No. 2,753,063 which pivots a hoisting frame about the rear of a vehicle, and such as Jones U.S. Pat. No. 3,128,893 and Schladenhauffen U.S. Pat. No. 3,708,081 which move the boat along a guide rail extending along the roof of the vehicle. However, these prior art devices are generally more complex and do not fold to as neat a transport position as that disclosed in this application. Moreover, most of the reasonably uncomplicated prior art devices are not manageable by a person single-handed.

OBJECTS OF THE INVENTION

It is the principal object of the invention to provide an improved apparatus for loading a boat, or other heavy objects, onto the roof of a vehicle and for unloading the boat to ground level, or below, wherein the apparatus can be easily handled by one person, and wherein unloading is facilitated by a spring system whose unloading action is opposed by a cable and winch system by which the boat is moved to loaded position.

It is another major object of the invention to provide conveyor means on the roof of the vehicle which are specially shaped and located on the roof to receive the boat when it approaches transport (fully loaded) position, and which are spring urged to push the boat toward launched (unloaded) position against the forces of the cable and winch system.

Still a further object of the invention is to provide an L-shaped hoist frame having one leg horizontally hinged to an upright panel of the vehicle and having its other leg releasably attached to the gunwales of the boat at a location spaced from the ends of the boat and reasonably close to its longitudinal center of balance, including any gear or outboard motor which may be stowed within or attached to the boat. The attachment of the other leg of the L-shaped frame to the boat gunwales is a pivotal attachment permitting the boat to rotate about the frame leg as it is moved from horizontal launched position to horizontal transport position, and the concept of keeping the pivotal attachment near the longitudinal center of gravity reduces the tendency of the boat to become unmanageable during its manipulation from one position to the other.

A further object of the invention is to provide apparatus wherein the boat receiving conveyor means includes a main conveyor for receiving one end of the boat as it approaches the roof and a trunnion conveyor means specially adapted to receive the outer end of the L-shaped hoist frame which is attached also to the boat gunwales, and these two conveyor means being spring biased to yieldably urge the boat away from transport position toward launched position.

Another important object of the invention is to provide means for locking the L-shaped hoist frame in transport position to secure the boat against unauthorized launching or theft.

A further object of the invention is to provide a boat loader of the type described wherein an auxiliary cable is stretched between the main conveyor means which receives one end of the boat and a fastener located at the other end of the boat itself, this auxiliary cable serving to rotate the boat to invert it as it moves from its upside-down storage and transport position toward its upright launched position adjacent to the vehicle.

It is a general object of the invention to provide a sturdy apparatus which is efficient both for storing and hoisting a boat, and which accomplishes these objects with the minimum complexity of expensive parts.

Other objects and advantages of the invention will become apparent during the following discussion of the drawings, wherein:

THE DRAWINGS

FIG. 1 is an elevation view of a camping vehicle showing an illustrative embodiment of the loading and unloading apparatus and the boat in several positions;

FIG. 2 is a fragmentary view similar to FIG. 1, but showing the boat stored in transport position;

FIG. 3 is a rear view of the vehicle with the boat in transport position;

Figure 5:
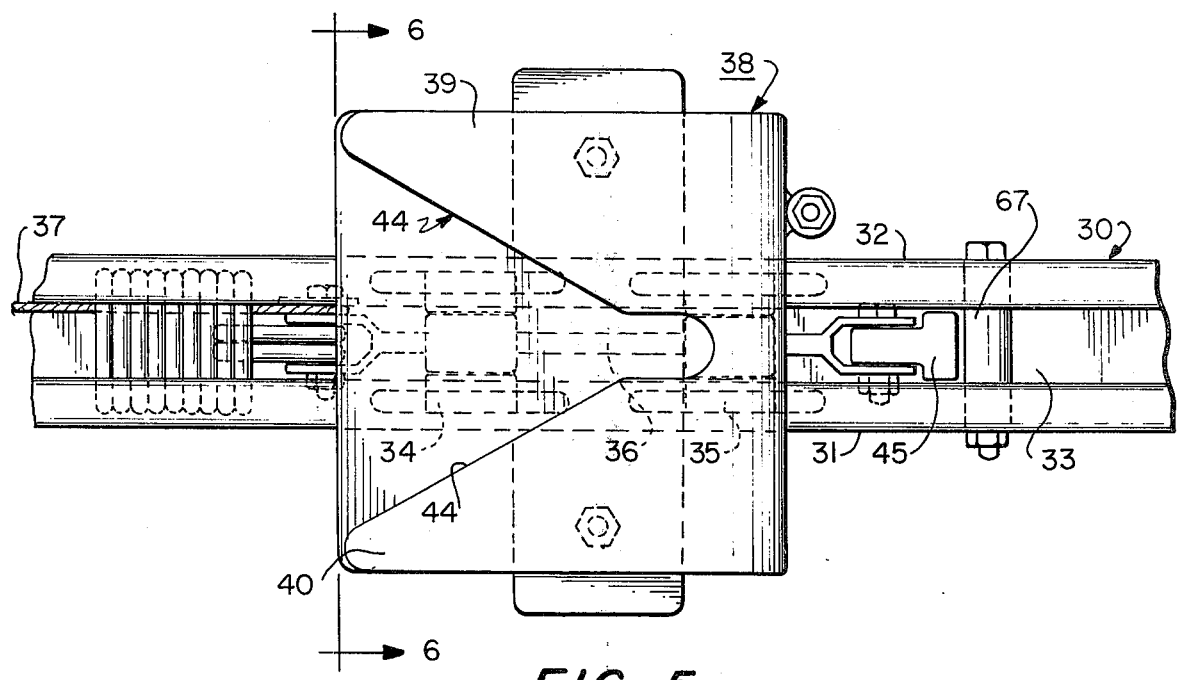
Figure 6:
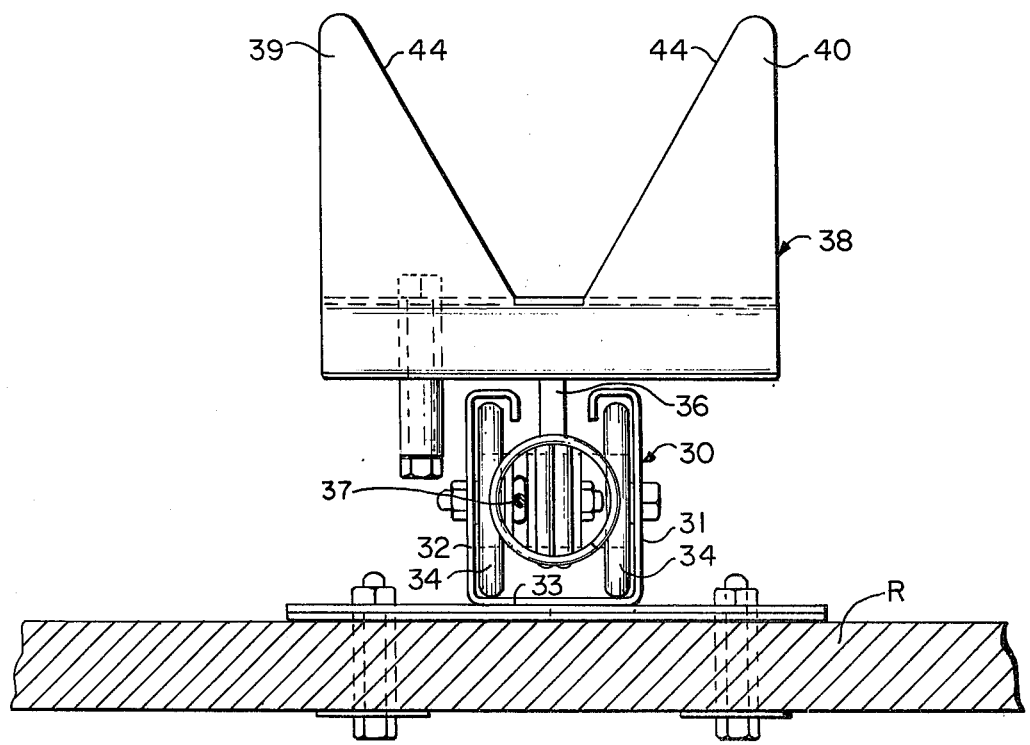

FIGS. 4A, 4B, 4C and 4D when considered together show a detail view of the guide rail and conveyor means located on the vehicle roof;

FIG. 5 is a plan view of the main conveyor means on the roof rail;

FIG. 6 is a section view taken along line 6—6 of FIG. 5;

FIG. 7 is an enlarged fragmentary view showing the manner of attachment of the L-shaped hoist frame to a gunwale of the boat; and FIG. 8 is a perspective view showing the arm which is pivoted to the trunnion conveyor engaging a bar attached to the outer end of the outer leg of the L-shaped hoist frame.

Referring now to the drawings, FIGS. 1, 2, and 3, show a camper vehicle V having a roof R and an upright rear panel P. A boat B is moved between a storage and transport position as shown in FIG. 2 and FIG. 3 and a launched position as shown in solid lines in FIG. 1. The boat is attached to, and moved from one position to another by apparatus secured to the camping vehicle V, and this apparatus includes an L-shaped hoist frame 10 including an inner leg 11 and an outer leg 12. The inner end of the inner leg 11 is pivotally mounted on the vehicle at a horizontal bearing shaft 14 which is mounted on fixed frame members 15 which are secured to the vehicle and best seen in FIG. 3. The horizontal bearing means 14 includes a shaft 16 extending between the two upright members 15 and receiving the inner ends 11a and 11b of the L-shaped frame member 10. The horizontal bearing is positioned about half-way up the back upright panel P of the vehicle as measured from the ground G, and the L-shaped frame 10 pivots about the bearing means 14 in the manner most clearly illustrated in FIG. 1.

The outer end of the outer leg 12 of the L-shaped frame member is attached to the gunwale of the boat by means of a bolt 17 located on each side of a bar 18 which extends all the way across the boat and has a releasable securing means at each gunwale including a plate 19 fixed to the boat, see FIG. 7. Each bolt 17 extends through a boss 20 at each end of the bar 18 and affixes the latter to the plate 19 so as to fix the outer end of the L-shaped frame 10 to the boat. Inside the bar 18 and the boss 20 is a stub shaft 21 which rotatably supports the outer ends 12a of the outer legs 12 of the L-shaped frame. Thus, the boat is in effect pivotally fixed at both gunwales to the outer ends of the L-shaped frame, and is rotatable with respect thereto about the axis of the rod 18 and the shafts 21. As can be seen in FIGS. 1, 7, and 8, the bar 18 has a pair of spaced lugs 23 and 24 welded to it for the purpose hereinafter stated. The legs of the L-shaped frame 11 and 12 are welded together at their intersection and they also include a brace 13 designed to hold the right angle of the frame members.

A winch 25 can be seen in FIGS. 1 and 3, and this winch includes a crank shaft 26 with a handle at its outer end. Two cables extend upwardly from the winch as will be described presently.

Along the roof of the vehicle there extends a rail 30 which is located centrally with respect to the boat, and can be laid in any desired direction along the roof of the vehicle, either cross-wise or length-wise, the latter being shown in the present illustration. The rail 30 can best be seen in FIGS. 4, 5, and 6, and it comprises a specially shaped channel member having two upright sides 31 and 32, and a bottom web 33 which is secured to the roof R of the vehicle in any desired manner. The channel has two conveyors supported on rollers which roll within the channel as can be best seen in FIGS. 4A, 4C, 5 and 6. The forward-most conveyor is shown in FIGS. 4A, 5 and 6 and comprises a set of wheels generally referred to by the reference characters 34 and 35, and these support a main conveyor block 36 to which a number of parts are attached. It is the purpose of this block to receive the bow of the boat and to support it whenever the boat is in the storage and transport position. Referring to FIGS. 5 and 6, the block 36 which is supported on the wheels 34 and 35 in turn carries a chock 38 having two upstanding guide members 39 and 40 which are directed rearwardly of the vehicle. On the other hand, the boat has a bow plate secured to its bow, the plate being best illustrated in FIG. 1 and FIG. 4a and comprising two legs 41 and 42 designed respectively to lie along the stem of the boat and along the deck of the boat, these plates being welded or bolted to the boat. The plates 41 and 42 carry an upright guide rod 43 and a horizontal guide rod 43a by which the bow of the boat is guided into the wedge 44 forming a part of the chock member 38 as seen in FIGS. 5 and 6. The plates 41 and 42 and the guide rods 43 and 43a remain with the boat when it is in launched position as can be seen for example in FIG. 1 which shows the boat in the water.

FIG. 4B shows a pair of reversing pulleys which are mounted outside of the channel 30 on both sides thereof and supported in brackets 47, the pulleys being labelled 48. These pulleys are used to reverse the direction of the two main cables, namely cables 27 and 28 which can be seen extending up the back of the truck from the winch 25 as shown in FIG. 3. Their purpose will be explained shortly. The pulleys 48 are fixed in position as shown in FIGS. 1 and 2 lengthwise of the rail 30.

FIG. 4C shows the other conveyor which is referred to herein as the trunnion conveyor 50 which is capable of travelling along the rail 30 in both longitudinal directions with respect to the reversing pulleys 48, the trunnion conveyor 50 being in front of the reversing rollers 48 in FIG. 2 and to the rear of the reversing pulleys 48 in FIG. 1. Like the main conveyor in FIG. 4A the trunnion conveyor in FIG. 4C comprises a block 51 supported by two pairs of rollers 52 and 53 which also roll within the channel of the rail 30 and are captivated therein. The block 51 supports an upstanding lug 54 and this lug pivotally supports an arm 55 which extends rearwardly and upwardly as can be seen in FIGS. 4C, 4D, 1 and 8. The arm 55 has a receiving guide 56 located at its outer end for receiving the bar 18 when it arrives at the dashed line position shown in FIG. 8 as will be further explained hereinafter. The arm 55 also includes a bracket 57 which supports two small rollers 58 to guide the cables 27 and 28 on either side of the arm as can best be seen in FIG. 8.

Finally, as shown in FIG. 4D at the extreme terminus end of the rail there is a guide pulley means 60 which includes two spaced pulleys 62 and a central pulley 61 all of which handle different cables in the manner about to be explained. The guide pulley means includes a block 63 which not only supports the pulleys, but includes an opening 64 which is designed to cooperate with a lug 22 which can best be seen in FIG. 2 and again in the bottom position of the L-shaped frame as shown in FIG. 1. For this purpose, a padlock (not shown) is inserted through the lug 22 and through the hole 64 in the guide pulley means block 63.

One of the principal features of the present invention is the spring means by which the two conveyors 36 and 50 are yieldably pulled rearwardly toward the terminus end of the rail on which the guide pulley means 60 is supported. This spring means includes two separate coil springs, the first of which comprises the coil spring 66 which can be seen stretched between the stationary pulley guide means 60 and the trunnion conveyor 50 so that the trunnion conveyor 50 is continuously urged in the rearward direction by the spring 66. The other spring means comprises the spring 68 which is attached to the forward end of the trunnion conveyor 50, FIG. 4C, and stretches to the rear end of the main conveyor 36, FIG. 4A, which receives the bow of the boat. Thus, the spring 68 also urges the main conveyor 36 rearwardly, but the two springs together permit some adjustment in the relative position of the trunnion conveyor 50 between the stationary terminus end at 60 of the rail 30 and the main conveyor 36.

For the sake of convenience in mounting and handling the boat, the boat has fixed to it three metal plates with fastening means assembled to them including the plate 41–42 carrying guide rods 43 and 43a attached to the bow, FIG. 1, and the two plates labelled 19 attached to the gunwales where the outer leg of the L-shaped hoist frame is connected to the boat as shown in FIG. 7. The boat is brought under the frame legs 12 and the two bolts 17 are extended through the bar 18 and the boss 20 and screwed into the plates 19. It is preferable, but not necessary that the connection be located near the center of gravity of the boat, and in this illustration, the center of gravity of the boat is somewhat aft of center since there is an outboard motor M stored in the stern of the boat.

The winch has two cables labelled 27 and 28 extending from the winch upwardly and over the pulleys 62 and extending through the various positions shwon in FIG. 4 and entering the bottom of the reversing pulleys 48 on each side of the rail 30, and then extending back toward the rear again from the reversing pulleys 48 in FIG. 4B above the trunnion conveyor 50 in FIG. 4C and between the guide pulleys 58 on the arm 55 as shown in FIG. 4D and again in FIG. 8. It will be seen in FIG. 8 that the cable 27 is on the near side of the rail 30 as viewed in FIG. 1, and on the far side of the rail there is located the cable 28. The cables 27 and 28 then attach to the lugs 23 and 24 as shown in FIGS. 1, 7, and 8, and it is these cables 27 and 28 which pull the boat upwardly into the stored position, or by relaxing their tension allow it to be spring urged toward launched position. There is another auxiliary cable 37 which can be seen in FIGS. 1, 2, 4, and 8 and which attaches at its forward end to the rear end of the main conveyor, and the cable 37 then extends centrally down through spring 68 in the channel of the rail 30 between the reversing rollers 48 as shown in FIG. 4B, then across a guide roller 59, through alignment tube 55a and exiting as shown in FIGS. 4C and 4D, and finally across the guide pulley 61 (sometimes resting on it) and downwardly to be fixed to the stern of the boat at a hook fitting 49 which can best be seen in FIG. 1.

OPERATION OF THE APPARATUS

The loader operates as follows: With the boat attached at its gunwale plates 19 to the outer ends 12a of the outer frame legs 12 using the bolts 17, when the winch 25 is operated to tension the cables 27 and 28 which extend essentially vertically therefrom in an upward direction, the cables 27 and 28 begin pulling the lugs 23 and 24 upwardly to begin raising the boat from the launched position shown in solid lines in FIG. 1 toward the stored position on top of the vehicle V. As the hoist frame rises, being raised by the cables 27 and 28 about the bearing means 14, its outer leg 12 passes through a vertical position and continues in the direction of the arrows shown in FIG. 1. As the boat passes the vertical position, its bow begins to descend toward the trailer roof so that it turns over into a more nearly horizontal position. During this time, the unwinched portions of the cables 27 and 28 extending to the boat keep growing shorter, but the cable 37 has virtually not changed length. As the bow approaches the chock member 38 which is positioned by the stop 40b on the main conveyor 36, the upright guide rod 43 slides between the guide surfaces 44 and enters the bow squarely into the middle of the chock. At the same time, the plates 41 and 42 and the guide pin 43a, which are secured to the boat, accurately captivate the bow in the chock, the pin 43a locating the bow against vertical displacement, and the pin 43 locating the bow against horizontal displacement in the chock 38. Since the cable 37 stretches between a point 49 inside the stern of the boat to the main conveyor and bow chock 38 and is the same length as the boat, the chock and the boat both move forward together on the main conveyor 36 at the same rate. Thus, the cable 37 serves the purpose of holding the chock 38 and the boat together in the proper position while the bow of the boat is on the conveyor, and it accomplishes this purpose without in other positions of the apparatus preventing launching of the boat. When the boat reaches the uppermost position shown in FIG. 1, it will be noted that the cables 27 and 28 which pass through the guide pulleys 57 on the arm 55 have elevated the arm 55 to just the right angle so that the receiving guide member 56 is in position to receive the middle of the bar 18 in the manner shown in dotted lines in FIG. 8. Thus, as the cables 27 and 28 are reeled in upon the winch 25, the boat, the end 12a of the L-shaped frame, the arm 55 and both conveyors 36 and 50 all move forward along the vehicle roof at a uniform rate stretching the springs 66 and 68 inside the guide rail 30 until the boat reaches the position shown in FIG. 2. At this time, the lug 22 has its hole lined up with the hole 64 in the block 63, and a padlock can be inserted therethrough.

When it is desired to move the boat from the transport position shown in FIG. 2 to the launched position shown in solid lines in FIG. 1, it is only necessary that the operator remove the padlock and release the latch on the winch 25 and slowly pay out the cables 27 and 28. When this is done, the tension springs 66 and 68 pull the two conveyors 36 and 50 rearwardly so that the boat returns essentially to the uppermost position shown in FIG. 1. In this position, if the operator continues to slowly pay out the cables 27 and 28 the boat will start lowering toward the launched position. The boat will turn around into an upright position and then continue on to the position shown in full lines in FIG. 1 where it is launched. Thus, it is an easy matter for one person to either load or unload the boat from the rooftop of the vehicle.

It should also be noted that if the bolts are removed from the gunwales, a block and tackle hoist can be inserted between the boat and the bar 18 and this block and tackle can be used to lower the boat into water further below the level of the ground G, so that the boat can for instance be launched from a pier located some distance above the water.

In order to secure the boat better against forward motion when it is in the transport position shown in FIG. 2, such as might occur when the vehicle brakes are heavily applied, stops 65 and 67 are placed upon the rail such that the conveyors 50 and 38 are blocked against further forward motion. The stops 65 and 67 are also provided as limit stops for the conveyors 50 and 38 in case of spring breakage. The stops 67 is particularly visible in FIG. 5 where it is abutted by a bumper member 45 carried on the front of the main conveyor 36. Note that when the boat is in its fully stored position the bracket 63 is abutted by the intersection of the frame arms 11 and 12 with the hole 22 aligned with the hole 64 to receive a padlock.

This invention is not to be limited to the exact illustrative embodiment shown in the drawings, for obviously changes can be made within the limitations of the following claims:

I claim:
1. Apparatus for loading a boat to a transport position wherein it is supported inverted on the roof of a vehicle and for unloading the boat into a launched position next to an upright panel of the vehicle, comprising:
   a rail fixed along the roof of the vehicle and having a terminus end located where the roof meets the panel;
   a bearing disposed horizontally across the panel and spaced from the roof and the ground;
   an L-shaped hoist frame having an inner leg supported on said bearing and having the outer end of its outer leg pivotally attached to the gunwales of said boat intermediate the ends of the boat, said outer end of the frame lying near ground level in said launched position and lying at an intermediate point along the rail in the transport position;

a winch on the vehicle panel cooperating with main cable means which extends from the winch to idler pulley means at the terminus end of the rail, then along the rail to reversing pulley means located at the rail just beyond said intermediate point, and then back along the rail and over the idler pulley means and finally fixed in the outer end of said hoist frame;

main conveyor means slidably mounted on the rail and having means to receive and guide one end of the boat along the rail;

trunnion conveyor means slidably mounted on the rail between the main conveyor means and the terminus end of the rail and having means to receive the outer end of the L-shaped hoist frame;

tension spring means yieldably urging the main conveyor means and the trunnion conveyor means along said rail toward said end thereof; and stops on the rail cooperating with said spring means to position the conveyor means to receive the boat and frame as it approaches the transport position.

2. Apparatus as set forth in claim 1, wherein the main conveyor means is coupled with the other end of the boat by an auxiliary cable which extends therebetween along the rail and passes over the idler pulley means at the terminus end of the rail.

3. Apparatus as set forth in claim 1, wherein said means for receiving the outer end of the L-shaped hoist frame comprises an arm pivotally mounted at one end on the trunnion conveyor means and having its other end extending in the direction of the terminus end of the rail, means at the other end of the arm to receive the outer end of the frame which is pivotally mounted to the boat gunwales; and guide pulley means near said other end of the arm for guiding said main cable means whereby the other end of the arm is raised from the rail to receive said outer end of the frame when the boat and frame approach the transport position.

4. Apparatus as set forth in claim 1, wherein said rail comprises a U-shaped channel having a wheel track on both sides, and said conveyor means include wheels spaced laterally of the rail and running in each track, and said tension spring means comprises springs within the channel stretched respectively between the terminus end of the rail and said trunnion conveyor, and between said trunnion conveyor and said main conveyor, and said rail having a stop for stopping the main conveyor from moving further away from the terminus end of the rail when the boat has reached transport position.

5. Apparatus as set forth in claim 1, wherein the outer leg of the hoist frame lies along the rail when the apparatus is in transport position, and the intersection of the inner and outer legs of the frame lies substantially at said terminus end of the rail, and means for locking the frame to said terminus end to prevent moving of the boat from said transport position.

6. Apparatus as set forth in claim 1, wherein said reversing pulley means are so located along the rail that when the main cable means is tensioned to place the boat in transport position, the trunnion conveyor means and the main conveyor means are both located beyond the reversing pulley means with respect to said terminus end of the rail thereby strongly tensioning said spring means, whereby when the main cable means is slacked the spring means moves the boat toward the terminus end of the rail toward launched position.

7. Apparatus as set forth in claim 1, including releasible securing means operative for attaching the outer end of the outer leg of the hoist frame to the gunwales of the boat at a position near its longitudinal center of gravity.

8. Apparatus as set forth in claim 1, wherein said main conveyor means includes a chock for receiving said one end of the boat and supporting it.

* * * * *